(12) United States Patent
Tokunaga et al.

(10) Patent No.: US 8,911,320 B2
(45) Date of Patent: Dec. 16, 2014

(54) POWER TOOL

(75) Inventors: Manabu Tokunaga, Anjo (JP); Akihiro Ito, Anjo (JP); Shinji Hirabayashi, Anjo (JP)

(73) Assignee: Makita Corporation, Anjo-Shi (JP)

( * ) Notice: Subject to any disclaimer, the term of this patent is extended or adjusted under 35 U.S.C. 154(b) by 380 days.

(21) Appl. No.: 13/392,765

(22) PCT Filed: Aug. 19, 2010

(86) PCT No.: PCT/JP2010/063978
§ 371 (c)(1),
(2), (4) Date: Feb. 27, 2012

(87) PCT Pub. No.: WO2011/024697
PCT Pub. Date: Mar. 3, 2011

(65) Prior Publication Data
US 2012/0165152 A1 Jun. 28, 2012

(30) Foreign Application Priority Data

Aug. 28, 2009 (JP) .................................. 2009-197761
Aug. 28, 2009 (JP) .................................. 2009-197765

(51) Int. Cl.
| F16H 15/50 | (2006.01) |
| F16H 57/04 | (2010.01) |
| B27B 17/08 | (2006.01) |
| B23D 47/12 | (2006.01) |
| B24B 23/02 | (2006.01) |
| B24B 47/12 | (2006.01) |
| B25B 21/00 | (2006.01) |
| B25F 5/00 | (2006.01) |
| F16H 15/52 | (2006.01) |

(52) U.S. Cl.
CPC ............... *B27B 17/08* (2013.01); *B23D 47/12* (2013.01); *B24B 23/028* (2013.01); *B24B 47/12* (2013.01); *B25B 21/00* (2013.01); *B25F 5/001* (2013.01); *F16H 15/52* (2013.01)
USPC .................. 475/186; 475/159; 476/48; 476/8

(58) Field of Classification Search
USPC ............................................. 475/185; 476/47
See application file for complete search history.

(56) References Cited

U.S. PATENT DOCUMENTS 2,297,078 A * 9/1942 Schlichter ...................... 476/47
4,966,057 A 10/1990 Koppatsch
(Continued)

FOREIGN PATENT DOCUMENTS

DE    36 34 734 A1    4/1988
EP    0 302 229 A2    2/1989
(Continued)

OTHER PUBLICATIONS

International Search Report issued in International Application No. PCT/JP2010/063979 dated Nov. 9, 2010.
(Continued)

*Primary Examiner* — Jacob S Scott
(74) *Attorney, Agent, or Firm* — Oliff PLC

(57) ABSTRACT

In a disc grinder, a spindle mounted with a grindstone intersects an output shaft of an electric motor. The disc grinder includes the three-point pressing continuously-variable transmission between the output shaft of the electric motor and a bevel gear train. The bevel gear train is used for deceleration. The traction grease having a high traction coefficient is used as the lubricant of the traction drive. A grease reservoir or felt members arranged in sliding contact with the pressing parts are disposed in the transmission case.

22 Claims, 7 Drawing Sheets

(56) References Cited

U.S. PATENT DOCUMENTS

| | | | |
|---|---|---|---|
| 5,711,739 | A | 1/1998 | Hashimoto et al. |
| 6,176,162 | B1 | 1/2001 | Ludwig et al. |
| 2009/0098971 | A1 | 4/2009 | Ho et al. |

FOREIGN PATENT DOCUMENTS

| | | | |
|---|---|---|---|
| EP | 2 030 710 A2 | | 3/2009 |
| JP | A-63-068352 | | 3/1988 |
| JP | B2-03-073411 | | 11/1991 |
| JP | A-05-187497 | | 7/1993 |
| JP | U-05-067456 | | 9/1993 |
| JP | A-06-190740 | | 7/1994 |
| JP | A-09-300339 | | 11/1997 |
| JP | A-10-505794 | | 6/1998 |
| JP | A-2000-108046 | | 4/2000 |
| JP | A-2000-278907 | | 10/2000 |
| JP | A-2002-059370 | | 2/2002 |
| JP | 2002066960 A | * | 3/2002 |
| JP | A-2002-66960 | | 3/2002 |
| JP | A-2002-066960 | | 3/2002 |
| JP | B2-3289958 | | 6/2002 |
| JP | A-2002-283255 | | 10/2002 |
| JP | B2-3391951 | | 3/2003 |
| JP | A-2006-326766 | | 12/2006 |
| JP | A-2008-271791 | | 11/2008 |
| JP | A-2009-83033 | | 4/2009 |
| RU | 1770177 A1 | | 10/1992 |
| RU | 2 184 026 C2 | | 6/2002 |
| RU | 2 267 042 C2 | | 9/2002 |
| RU | 2 267 042 C2 | | 12/2005 |
| SU | 126601 | | 11/1959 |
| SU | 1148767 A | | 4/1985 |
| WO | WO 99/40345 | | 8/1999 |
| WO | WO 2009/044932 A1 | | 4/2009 |

OTHER PUBLICATIONS

Extended European Search Report issued in European Application No. 10811747.4 dated Jan. 30, 2013.
U.S. Appl. No. 13/392,707, filed Feb. 27, 2012.
International Search Report in International Application No. PCT/JP2010/063978; dated Nov. 9, 2010 (with English-language translation).
Taigang et al., "Lubricating Grease and Additives for Vehicles," Jul. 2006, pp. 2-3, Chemical Industry Press.
Dec. 2, 2013 Chinese Office Action issued in Chinese Application No. 201080043345.5 (with translation).
Feb. 13, 2014 Russian Office Action issued in Russian Application No. 2012111817 (with translation).
Feb. 14, 2014 Russian Office Action issued in Russian Application No. 2012111814 (with translation).
European Search Report issued in European Patent Application No. 10811747.4 dated Apr. 22, 2013.
European Office Action issued in European Patent Application No. 10 811 748.2 dated Sep. 9, 2013.
Extended European Search Report issued in European Patent Application No. 10811748.2 dated Apr. 2, 2013.
Japanese Office Action issued in Japanese Patent Application No. 2009-197765 dated Jun. 4, 2013 (w/translation).
Japanese Office Action issued in Japanese Patent Application No. 2009-197762 dated Jun. 4, 2013 (w/translation).
Japanese Office Action issued in Japanese Patent Application No. 2009-197761 dated Jun. 4, 2013 (w/translation).
May 23, 2014 Office Action issued in Russian Patent Application No. 2012111817/02(017796) (with translation).
Aug. 20, 2014 Office Action issued in European Patent Application No. 10811747.4.
Apr. 18, 2014 Office Action issued in Russian Patent Application No. 2012111814/13(017793) (with translation).

\* cited by examiner

// POWER TOOL

BACKGROUND OF THE INVENTION

The present invention relates to a power tool, such as a grinder, a screw fastening tool, or a cutting tool, having an electric motor as a driving source. The present invention relates to a power tool, such as a chain having an engine (internal combustion engine) as a driving source.

DESCRIPTION OF THE RELATED ART

Such a power tool includes a reduction gear train for reducing (changing) rotation rate of rotational power from a driving source. Alternatively the power tool includes a gear train for changing an output direction of the rotational power from the driving source. The reduction gear train may be a spur gear train or a planetary gear mechanism. The gear train for changing the output direction may be a bevel gear train. The switching feature switches a power transmission path of the reduction gear train depending on a load torque applied to a pit (tool tip). Thereby the switching feature switches the output state between a high-speed low-torque output mode and a low-speed high-torque output mode.

The rotary power transmission mechanism is not limited to the installation in the power tool. Both a continuously-variable transmission (CVT) continuously changing a reduction ratio and the configuration step-like changing the speed to a lower speed or a higher speed by switching the power transmission path of the gear train are known as rotary power transmission mechanism.

In the continuously-variable transmission traction drive, an input-side solar roller and an output-side thrust roller are pressed against plural conical planetary rollers with a large force by the use of a thrust mechanism to achieve rolling contact. Power is transmitted through the rolling contact between them. A transmission roller is pressed against the conical surfaces of the planetary rollers, and moves between places on the planetary rollers having small and large diameters. Accordingly, the continuously-variable transmission can continuously change output rotation speed.

DISCLOSURE OF THE INVENTION

Problem to be Solved by the Invention

Since the continuously-variable transmission includes an input shaft and an output shaft coaxially aligned, it can be relatively easily installed in a screw-fastener in which the output shaft and the spindle are arranged coaxially. The output shaft serves as the driving source for the electric motor while the spindle serves as the output shaft of the output shaft of the power tool. The output shaft and spindle may be mounted with the screw-fastening pit. However, many power tools in which the output shaft of a driving source and the spindle are not coaxially arranged. For example, in the disc grinder, the spindle is disposed at a position perpendicular to (intersecting) the output shaft of the electric motor. In a cutter such as a portable disc saw, the spindle is disposed at a position in parallel, but separated from the output shaft of the electric motor.

The machining direction of a tool tip mounted on a spindle for a workpiece, in a disc grinder, a portable disc saw, a chain saw, a circular grindstone, or a circular saw blade are of importance. The machining direction of the chain is arranged to intersect either the output shaft of the driving source or the output shaft of the reduction mechanism.

An object of the invention is to allow more various power tools to rapidly and satisfactorily perform a machining operation and to enhance their performance thereof. It is another object of the invention to use the continuously-variable transmission to power tools in which the output shaft of a driving source and the spindle are not coaxially aligned as well as in power tools in which the machining direction of a tool tip intersects the output shaft of a driving source.

SUMMARY OF THE INVENTION

The above-mentioned object is accomplished by the following aspects.

A first aspect of the invention provides a power tool including a continuously-variable transmission traction drive. The power tool includes a separate shaft, which is not aligned coaxially with the output shaft of the continuously-variable transmission. It is as a spindle to be mounted with a tool tip.

According to a first aspect, the power of a driving source is decelerated through the continuously-variable transmission traction drive and is output to the spindle. The spindle is not coaxial with the output shaft of the continuously-variable transmission. For example, in a portable disc saw, the spindle and the output shaft lie in parallel but are displaced by a predetermined distance. Alternatively, as is often found in a disc grinder, the spindle is positioned to intersect the output shaft.

Therefore, the continuously-variable transmission traction drive can be used for a power tool such as a disc grinder or a portable disc saw as well as the prior power tool. In the former power tool, the spindle lies in parallel and displaced a predetermined inter-axis distance from or intersects the output shaft of the continuously-variable transmission. In the prior power tool, such as a screw fastener or a drilling tool, the spindle is coaxial with the output shaft. This can further enhance the performance and add value to power tools thereof.

In the configuration described above, the output shaft of the continuously-variable transmission and the spindle are positioned to lie coaxially with each other. The configuration includes one in which the output shaft and the spindle are coaxially directly connected to each other and rotate together. It also included a configuration in which, for example, a planetary gear mechanism is interposed between both shafts and both shafts rotate at different rotating speeds about an identical center axis line.

On the contrary, in the other configuration described above, the spindle is an independent shaft not coaxial with the output shaft of the continuously-variable transmission. The other configuration includes a configuration in which, for example, a spur gear train is interposed between both shafts and both shafts rotate at the same rotating speed or at different rotating speeds with different axis lines as their center axis lines parallel to each other. It also includes a configuration in which, for example, a bevel gear train is interposed between both shafts and both shafts rotate at the same rotating speed or at different rotating speeds with different axis lines perpendicular to each other or intersecting each other at a predetermined angle as their center axis lines.

Therefore the first aspect enhances performance and value of power tools. In general power tools, an electric motor or an internal combustion engine (engine) is used as a driving source. The output shaft thereof has various angles about the axis line direction of the spindle. The continuously-variable transmission traction drive is disposed between the driving source and the spindle. Accordingly, it is possible to output power (the rotating speed and the output torque) suitable for the machining situation and thus to enhance performance and added value of various power tools.

A second aspect of the invention provides the power tool according to the first aspect, wherein the spindle intersects the output shaft of the continuously-variable transmission. According to the second aspect, it is possible to obtain the benefit based of the continuously-variable transmission traction drive, for example, for a disc grinder.

A third aspect of the invention provides the power tool according to the first aspect, wherein the spindle is disposed in parallel to the output shaft of the continuously-variable transmission. According to the third aspect, it is possible to obtain the benefit based on the continuously-variable transmission traction drive, for example, for a portable disc saw.

A fourth aspect of the invention provides the power tool according to any one of the first to third aspects, further including an auxiliary reduction mechanism of which the reduction ratio is fixed independently of the continuously-variable transmission.

According to the fourth aspect, the output which is continuously changed by the continuously-variable transmission. Here, the output may be decelerated again by the reduction mechanism with a fixed reduction ratio and output to the spindle. By using a bevel gear train as the reduction mechanism with a fixed reduction ratio, the spindle can be made to intersect the output shaft of the continuously-variable transmission. Alternatively, by using a spur gear train as the reduction mechanism with a fixed reduction ratio, the spindle can be made to be parallel to the output shaft of the continuously-variable transmission with a predetermined inter-axis distance interposed therebetween. By using a planetary gear train as the reduction mechanism with a fixed reduction ratio, the spindle can be made to be coaxial with the output shaft of the continuously-variable transmission.

A fifth aspect of the invention provides the power tool according to the fourth aspect, wherein the reduction mechanism is a gear reduction mechanism. According to the fifth aspect, for example, in a portable disc saw, the continuously-variable transmission traction drive can be interposed between the electric motor and the spindle. The electric source serves as a driving source for the continuously-variable transmission. The spindle can be aligned in parallel to the continuously-variable transmission output shaft with a predetermined inter-axis distance interposed therebetween. In this configuration, driving source power can be continuously changed by the continuously-variable transmission. It is further decelerated by the reduction mechanism, and is output to the spindle.

A sixth aspect of the invention provides the power tool according to the fourth aspect, wherein the reduction mechanism is a belt reduction mechanism. According to the sixth aspect, for example, in a portable disc saw, the continuously-variable transmission traction drive can be interposed between the electric motor and the spindle. The electric source serves as a driving source for the continuously-variable transmission. The spindle can be aligned in parallel to the continuously-variable transmission output shaft with a predetermined inter-axis distance interposed therebetween. In this case, the power of the driving source, which is continuously changed by the continuously-variable transmission, is further decelerated by the belt-reduction mechanism. The belt-reduction mechanism has a configuration in which power is transmitted between pulleys. The pulleys may have different effective diameters and may be mounted on the output shaft of the continuously-variable transmission and the spindle via a belt. The power is output to the spindle.

A seventh aspect of the invention provides a power tool having a continuously-variable transmission traction drive. In this power tool, the direction of operation of the tool tip mounted on a spindle intersects the direction of the output shaft.

According to the seventh aspect, it focuses on the machining direction of the tool tip operating on a piece to be altered (hereinafter "workpiece") as well as the axis line direction of the spindle. The continuously-variable transmission traction drive is provided as a transmission for power tools which may have various machining directions. Accordingly, it is possible to give the benefit of the continuously-variable transmission to a wide variety of power tools.

The machining direction of a tool tip on a workpiece is generally the perpendicular tangential direction of the spindle. So far, for example, in a disc grinder, it is the tangential direction of a rotating grindstone; in the case of a portable disc saw or a desktop circular sawing machine it is the a tangential direction of a rotating saw blade. In the case of a chain saw it is the moving direction of a chain. Therefore, the configuration in which the machining direction intersects the output shaft of the continuously-variable transmission includes various configurations. It includes a configuration in which the spindle is coaxial with the output shaft. It also includes a configuration in which the spindle is not coaxial with the output shaft but is parallel to the output shaft with a predetermined inter-axis distance. It also includes a configuration in which the spindle intersects the output shaft.

An eighth aspect of the invention provides the power tool according to the seventh aspect, wherein a cutting tool or a grinding tool is mounted as the tool tip.

According to the eighth aspect, the case where a cutting tool is mounted as the tool tip includes a case where a circular rotary saw blade is mounted on the spindle of a cutter such as a portable disc saw. It also includes the case where a grinding tool is mounted as the tool tip such as where a circular grindstone is mounted in a disc grinder. In such tool tips, the machining direction intersects the output shaft of the continuously-variable transmission or is parallel thereto.

A ninth aspect of the invention provides the power tool according to any one of the first to eighth aspects, wherein the reduction ratio of the continuously-variable transmission is changed in accordance with the load of the tool tip.

According to the ninth aspect, the reduction ratio is changed by the displacement of the transmission roller in the continuously-variable transmission traction drive. Accordingly, by displacing the transmission roller through adjustment of the torque load applied to the tool tip, an appropriate rotating speed and torque can be output to the tool tip. The transmission roller can be displaced by the use of a configuration which senses the load torque of the tool tip. For example, a device for measuring the load of the driving source, such as a sensor, can serve to automatically displace the transmission roller. This could be possible by using an actuator or a configuration whereby it could be manually adjusted.

A tenth aspect of the invention provides the power tool according to any one of the first to ninth aspects, wherein the continuously-variable transmission is a differential planetary mechanism type.

According to the tenth aspect, a continuously-variable transmission having a so-called three-point pressing traction drive mechanism pressing an input-side solar roller, an output-side thrust roller, and a transmission roller against a planetary roller can be used. Power tools having spindles with various axis lines of direction or various machining directions of tool tips may be used. Accordingly, it is possible for various power tools to benefit from this type of continuously-variable transmission.

When the transmission roller in a differential planetary type of continuously-variable transmission is moved to a large-diameter side of a planetary roller, the reduction ratio increases and the output state is switched to a low-speed high-torque output state. When the transmission roller is displaced to a small-diameter side, the reduction ratio decreases and the output state is completely switched to a high-speed low-torque output state.

On the contrary, in a two-point pressing traction drive mechanism having a planetary roller on the output side thereof reacts differently. When the transmission roller is displaced to a large-diameter side of the planetary roller, the reduction ratio decreases and the output state is switched to the high-speed, low-torque output state. Conversely, when the transmission roller is displaced to a small-diameter side, the reduction ratio increases and the output state is completely switched to a low-speed, high-torque output state.

An eleventh aspect of the invention provides the power tool according to any one of the first to tenth aspects, wherein a lubricant which is a semisolid in a normal state is used as a lubricant in the continuously-variable transmission.

According to the eleventh aspect, since the lubricant which is semisolid in a normal state is used as the lubricant of the continuously-variable transmission, it is possible to simplify the seal structure thereof. Accordingly, it is also possible to reduce the cost of the continuously-variable transmission, the cost of the power tool and simplify their configurations thereof.

The lubricant is a lubricant for power transmission. The lubricant is generally called traction grease. Traction grease has a high traction coefficient (the high traction coefficient is a dimensionless quantity obtained by dividing the tangential force in the rolling direction by the normal force) and an appropriate thickness (consistency). The lubricant is obtained by adding a thickener and an appropriate additive to base oil. Other materials with excellent performance in such as oxidation stability, rust resistance, and abrasion resistance can be used as the traction grease.

A twelfth aspect of the invention provides the power tool according to the eleventh aspect, wherein the lubricant is a grease with a high traction coefficient in which a thickener is added to base oil.

According to the twelfth aspect, the lubricant is obtained by adding a thickener to a traction oil as the base oil and can be treated as a high-viscosity semisolid (paste phase) not having the fluidity of oil. Accordingly, the transmission case of the continuously-variable transmission can prevent the leakage of the lubricant without an advanced seal structure and yet provide efficient lubrication.

A thirteenth aspect of the invention provides the power tool according to the twelfth aspect, wherein the thickener is 10-30% of the lubricant.

According to the thirteenth aspect, the lubricant can be obtained by adding the thickener (of 10-30%) to the base oil (traction oil).

A fourteenth aspect of the invention provides the power tool according to any one of the eleventh to thirteenth aspects, wherein the thickness of the lubricant is set to be in the range of 265 to 475.

According to the fourteenth aspect, the lubricant with a thickness of 265 to 475 is in a semi-fluid state or has a fluidity level lower than that found in a semi-fluid state. Accordingly, the transmission case can enhance and still prevent leakage of the lubricant without the need for a seal structure.

A fifteenth aspect of the invention provides the power tool according to any one of the eleventh to fourteenth aspects, further comprising a transmission case with a fixed inner volume for receiving the continuously-variable transmission.

If traction oil having a high fluidity is used as the lubricant, a volume-varying structure is necessary for avoiding the increase in pressure that typically accompanies a rise in temperature. In the fifteenth aspect, volume-varying structure can be omitted because the lubricant is semi-fluid and does not easily leak. Traction oil may be used as the lubricant to prevent the leakage of oil due to an increase in temperature and thus pressure in the continuously-variable transmission and transmission case. In such a situation, a means for temporarily increasing the free volume (a volume-varying means) may be necessary to suppress the increase in pressure in the case. Contrastingly, when a semisolid lubricant having low fluidity is used, using such an advanced seal structure is not necessary. In such a configuration, the temperature, and thus pressure, increases are unlikely to cause leakage. Therefore, it is not necessary to provide a volume-varying structure. It is thus possible to use a transmission case having a fixed volume.

A sixteenth aspect of the invention provides the power tool according to any one of the eleventh to fifteenth aspects, wherein the transmission case receiving the continuously-variable transmission includes a member for reducing a free volume.

According to the sixteenth aspect, the free volume in the transmission case is extremely reduced. Accordingly, it is possible to perform efficient lubrication with a small amount of lubricant. For example, the transmission case can be a to a rectangular box shape. After the continuously-variable transmission is attached along the inner wall surface of the transmission case, a member having a block shape or the like can be used to reduce the free space between the continuously-variable transmission and the case. It is thereby possible to inexpensively reduce the free space in a transmission case.

A seventeenth aspect of the invention provides the power tool according to any one of the eleventh to sixteenth aspects, wherein the amount of lubricant encapsulated in the continuously-variable transmission case is set to a maximum of half of the free volume of the transmission case.

According to the seventeenth aspect, a lubricant having low fluidity is used as the lubricant of the continuously-variable transmission. Accordingly, the same level of lubrication can be performed using a smaller amount of lubricant than that of the traction oil. The required level is that which it is necessary to agitate and drizzle the lubricant over necessary parts with the operation of the device. Therefore, at a maximum, the lubricant has only to be encapsulated by around a half of the free volume of the transmission case.

An eighteenth aspect of the invention provides the power tool according to any one of the eleventh to seventeenth aspects, wherein the continuously-variable transmission is positioned in the transmission case. The continuously-variable transmission is a three-point pressing traction drive in which a solar roller, a thrust roller, and a transmission roller are pressed against a conical planetary roller. The transmission case is partitioned into two chambers and the pressing parts of the each rollers are received in one chamber.

According to the eighteenth aspect, necessary power is transmitted to the three-point pressing parts: the solar roller, the thrust roller, and the transmission roller. These three rollers press against the planetary roller and use a lubricant membrane between the communicating parts. The total volume of the transmission case is partitioned into a space including the three-point pressing parts and the other space. The lubricant is encapsulated in the former space. Accordingly, it is possible to perform efficient lubrication with a smaller amount of lubricant and to satisfactorily transmit power.

A nineteenth aspect of the invention provides the power tool according to the eighteenth aspect, wherein the transmission case is partitioned by a wall formed of felt.

According to the nineteenth aspect, the space including the three-point pressing parts is partitioned from the other space by the wall formed of felt. Unlike the traction oil, the semisolid lubricant does not largely enter the felt barrier. The felt wall prevents the lubricant from leaking into the other space. Accordingly, it is possible to maintain an appropriate amount of lubricant encapsulated in the space including the three-point pressing parts over a long period of time.

A twentieth aspect of the invention provides the power tool according to the eighteenth or nineteenth aspect, wherein one chamber serves as a lubricant reservoir in which the lubricant is encapsulated.

According to the twentieth aspect, the transmission case is partitioned into two chambers by the wall formed of felt or a rib-shaped wall formed in a body with the inner surface of the case. The three-point pressing parts are received in one chamber and this chamber serves as a lubricant reservoir (a small space formed to be filled with the lubricant). Accordingly, it is possible to efficiently lubricate the pressing parts while preventing the leakage of the lubricant. This reduces the amount of encapsulated lubricant and enhances the maintenance of the power tool.

In the continuously-variable transmission traction drive, a so-called traction oil is generally used as the lubricant. Accordingly, in such a type of continuously-variable transmission, it is necessary to provide a seal structure for preventing the leakage of the traction oil. The object of a twenty-first aspect of the invention is to reduce the cost of a continuously-variable transmission or to simplify the configuration thereof, by getting rid of the traction oil seal structure.

A twenty-first aspect of the invention provides a power tool including a continuously-variable transmission traction drive, wherein a semisolid lubricant, in its normal state, is used as the lubricant of the continuously-variable transmission. Accordingly, it is possible to simplify the seal structure. As a result, it is possible to reduce the cost of the continuously-variable transmission and the power tool or to simplify the configuration thereof.

DETAILED DESCRIPTION OF THE INVENTION

Embodiments of the invention will be described below with reference to FIGS. 1 to 8. In the embodiments a continuously-variable transmission traction drive is used in various power tools. The continuously-variable transmission traction drive is known in the past and thus will not be described in detail.

Figure 1:
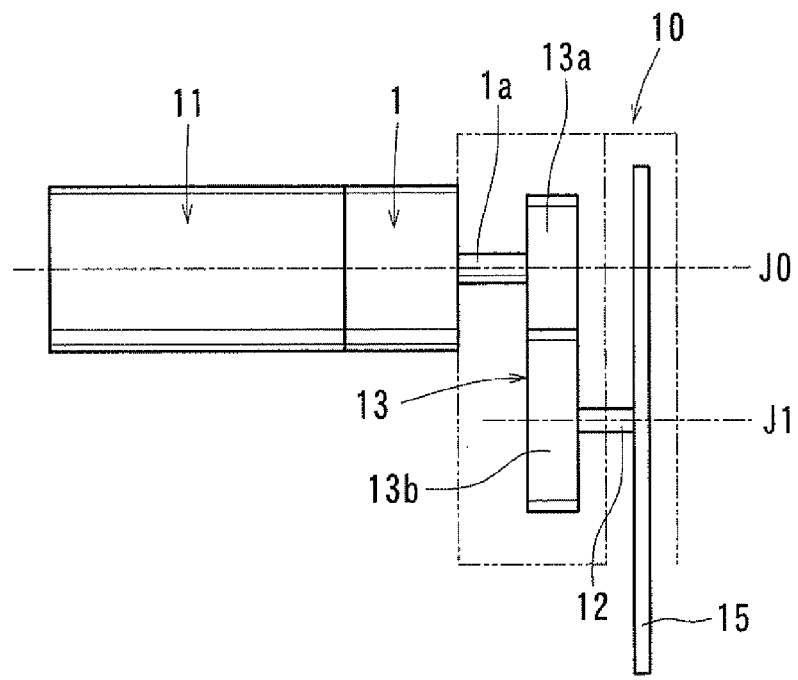
FIG. 1 is a general view of a portable disc saw with a continuously-variable transmission.
Figure 2:
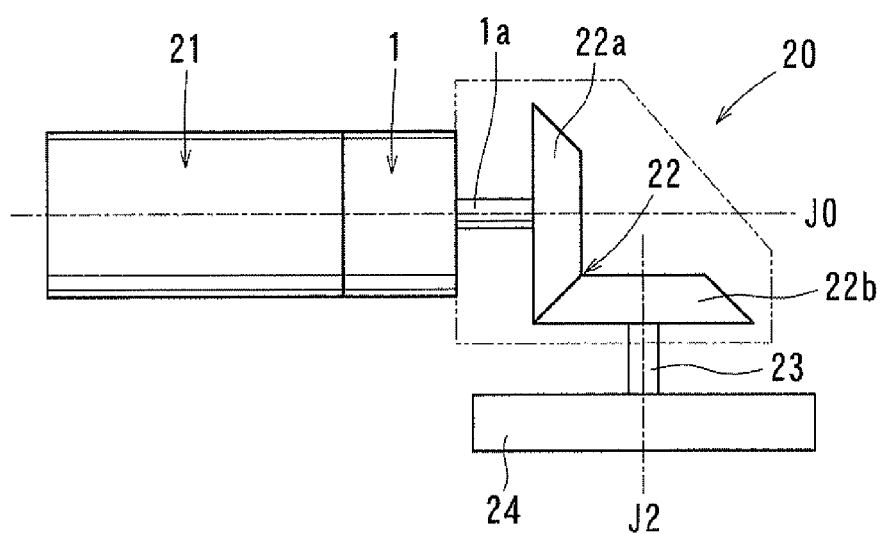
FIG. 2 is a general view of a disc grinder with a continuously-variable transmission.

FIGS. 1 and 2 show a power tool including a continuously-variable transmission traction drive 1 as a portable power tool. FIG. 1 shows a portable disc saw 10 and FIG. 2 shows a disc grinder 20.

As shown in FIG. 1, the portable disc saw 10 includes an electric motor 11 as a driving source. The continuously-variable transmission 1 is connected to the output shaft of the electric motor 11. The output from the electric motor 11 is decelerated by the continuously-variable transmission 1. A spur gear 13*a* as a driving side is attached to an output shaft 1*a* of the continuously-variable transmission 1. A spur gear 13*b* as a receiving side meshes with the spur gear 13*a*. The spur gear 13*b* is attached to the spindle 12. A reduction gear train 13 with a fixed reduction ratio is constructed by the spur gears 13*a* and 13*b*. The continuously-variable transmission 1 and the reduction gear train 13 decelerate the rotary power and then output it to the spindle 12. A circular cutting blade (saw blade) 15 is attached to the spindle 12. A rotation axis line J1 of the spindle 12 is aligned in parallel with a rotation axis line J0 of the output shaft 1*a* with a predetermined inter-axis distance interposed therebetween. The output shaft 1*a* is aligned coaxially with the output shaft of the electric motor 11.

As shown in FIG. 2, the disc grinder 20 includes an electric motor 21 as a driving source. The continuously-variable transmission 1 is connected to the output shaft of the electric motor 21. The output from the electric motor 21 is decelerated by the continuously-variable transmission 1. A bevel gear 22*a*, as a driving side, is attached to an output shaft 1*a* of the continuously-variable transmission 1. A bevel gear 22*b* as a receiving side meshes with the bevel gear 22*a*. The bevel gear 22*b* is attached to the spindle 23. A reduction gear train 22, with a fixed reduction ratio, is constructed by the bevel gears 22*a* and 22*b*. The continuously-variable transmission 1 and the reduction gear train 22 decelerate the rotary power and then output it to the spindle 23. A circular grindstone 24 is attached to the spindle 23. In the reduction gear train 22, a rotation axis line J2 of the spindle 23 is disposed perpendicularly to (intersect at 90°) a rotation axis line J0 of the output shaft 1*a*. The output shaft 1*a* is aligned coaxially with the output shaft of the electric motor 21.

In FIG. 1, the spindle 12 has a saw blade 15 as a tool tip attached thereto. In power tools such as the portable disc saw 10, the rotation axis line J1 is not coaxial with the rotation axis line J0 but rather is parallel thereto with a predetermined inter-axis distance interposed therebetween. In FIG. 2, the spindle 23 has a grindstone 24 attached thereto. In the power tools such as the disc grinder 20, the rotation axis line J2 is not coaxial with the rotation axis line J0 but is perpendicular thereto. Accordingly, appropriate power (rotation number and output torque) can be output depending on a cutting load or a grinding load (machining situation). In addition, it is possible to enhance the performance and added value of more various power tools.

Figure 3:
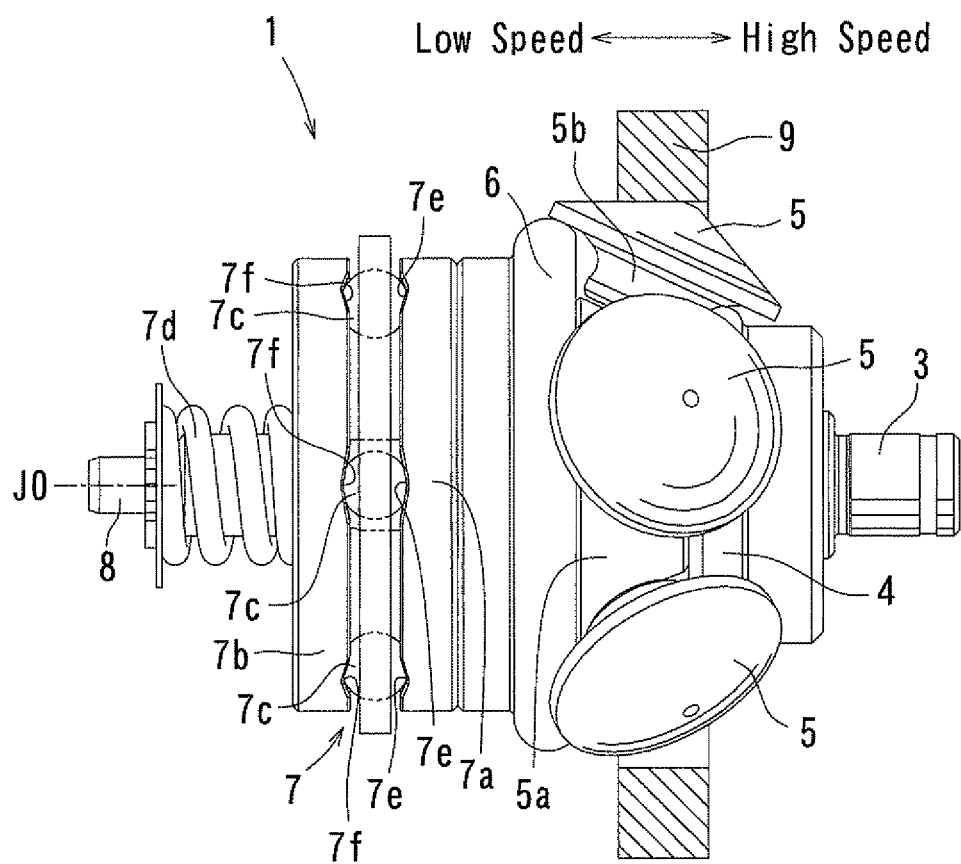
FIG. 3 is a side view of a three-point pressing traction drive mechanism.

FIG. 3 shows the specific internal structure of the continuously-variable transmission 1. The continuously-variable transmission 1 is a three-point pressing continuously-variable transmission. It includes an input shaft 3 connected to a driving source, a solar roller 4 attached to the input shaft 3, plural planetary rollers 5 having a conical shape, a thrust roller 6 pressed on the planetary rollers 5, a thrust earn mechanism 7 generating a thrust in the thrust roller 6, an output shaft 8, and a transmission roller 9. The internal side of the transmission roller 9 contacts the planetary rollers 5 and is pressed on the conical surfaces of the planetary rollers 5.

Plural planetary rollers 5 are arranged at a constant interval around a carrier 5a and are supported rotationally thereby. Each planetary roller 5 is supported in an erect position by a rotational axis line. This rotational axis line is inclined to the right side of the drawing by a predetermined angle.

The solar roller 4 is pressed on a pressing groove portion 5b of each planetary roller 5. The output shaft 8 extends to the rear side (the output side) from the thrust roller 6, and is integrally configured with the thrust roller 6. The thrust cam mechanism 7 is supported on the output shaft 8.

The thrust cam mechanism 7 includes a base frame part 7a, a pressing part 7b, and a plurality of steel balls 7c. The base frame part 7a is contacted with contacts the rear surface of the thrust roller 6. The pressing part 7b is supported to relatively rotate and approach or separate from the base frame part 7a. The pressing part 7b and the base frame part 7a are aligned in parallel. The plurality of steel balls 7c are inserted between the base frame part 7a and the pressing part 7b. The pressing part 7b is impelled in the direction in which it gets close to the base frame part 7a (to the right side in FIG. 3) by a compression spring 7d. The base frame part 7a is strongly pressed against the thrust roller 6 with the impelling force of the compression spring 7d. Thus the solar roller 4, the thrust roller 6, and the transmission roller 9 are pressed against the respective planetary rollers 5 with the same pressing force. The planetary rollers 5 rotate about their axes while being pressured against the transmission roller 9. Thus the planetary rollers 5 rotate about the axis line J0. The carrier 5a rotates about the rotation axis line J0 of the output shaft 8. Thereby the output shaft 8 rotates.

FIG. 3 shows a load-free state. In this load-free state, the steel balls 7c are interposed between concave engaging portions 7e of the base frame part 7a and concave engaging portions 7f of the pressing part 7b. When a rotary load is applied to the output shaft 8 in this load-free state, the pressing part 7b is displaced in the tangential direction relative to the base frame part 7a. Upon application of this load, the steel balls 7c are also displaced. Accordingly, the gap between the base frame part 7a and the pressing part 7b increases and the pressing force of the thrust roller 6 with respect to the planetary rollers 5 increases. Consequently, rotary power is transmitted to the output shaft by the three-point pressed state in which the solar roller 4, the thrust roller 6, and the transmission roller 9 are pressed on the planetary rollers 5.

When the transmission roller 9 is applied to the small-diameter side of the planetary rollers 5, high-speed/low-torque power is output. When the transmission roller 9 is applied on the large-diameter side of the planetary rollers 5, low-speed/high-torque power is output from the output shaft 8. A manual or automated transmission system may serve to operate the transmission roller 9. One example of an automated system would be a torque-responsive automatic transmission mechanism. In such a mechanism, the load of the output shaft 8 or the load of the electric motor is determined. Thereafter, an acutator moves to the low-speed side or high-speed side based on the determined load.

When the load of the output shaft 8 increases to be equal to or larger than a predetermined value and the steel balls 7c completely depart from the concave engaging portions 7e and 7f, the transmission of power is blocked. When the load is returned to a value equal to or smaller than the predetermined value, the steel balls 7c are inserted between the concave engaging portions 7e and 7f and the transmission of power is returned to a functional state.

In this way, the thrust cam mechanism 7 functions as a clutch which operates based on the load of the output shaft 8. The thrust cam mechanism 7 also operates to generate a pressing force in the continuously-variable transmission 1.

Figure 4:
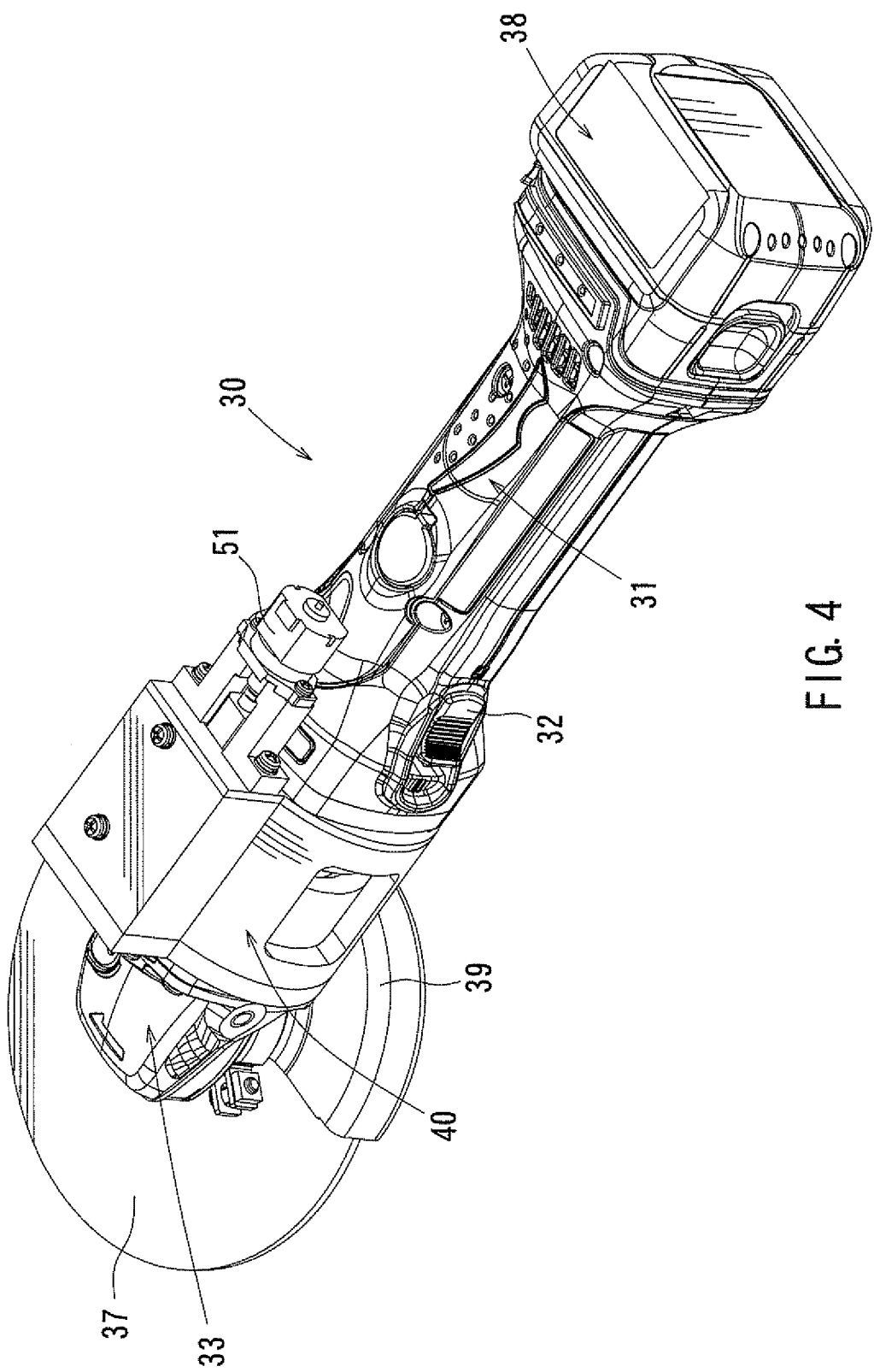
FIG. 4 is a general perspective view of a disc grinder with a continuously-variable transmission.
Figure 5:
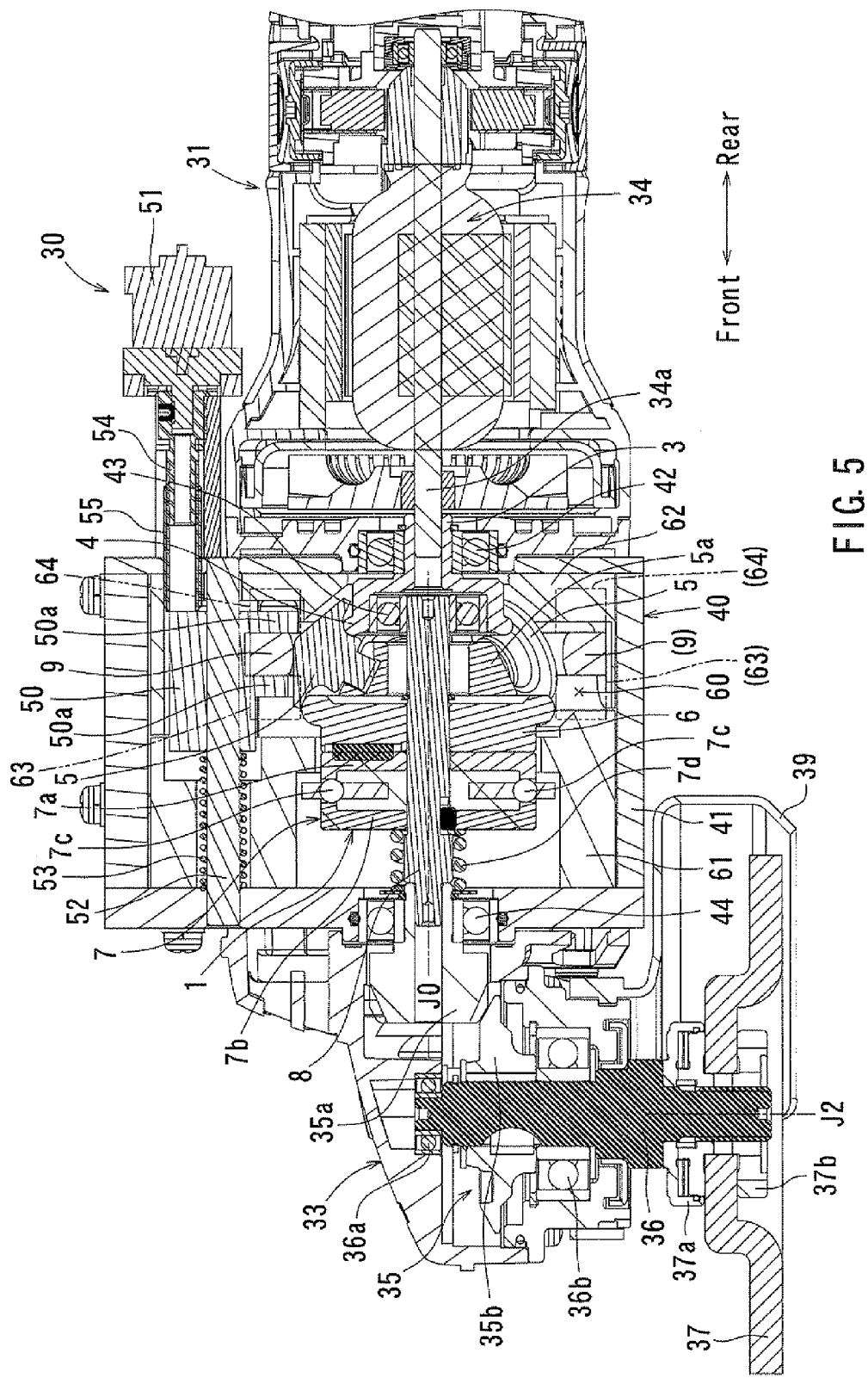
FIG. 5 is a vertical sectional view of the disc grinder.

FIGS. 4 and 5 show a disc grinder 30 having a three-point pressing continuously-variable transmission 1. In FIG. 4, the configuration of the disc grinder 30 is shown with more specificity than compared to FIG. 2. The disc grinder 30 includes a grip section 31 to be grasped by a user, a reduction section 40 and a gear head section 33. An electric motor 34 is built into the grip section 31 to be used as a driving source. The reduction section 40 is coupled to the front part of the grip section 31. The continuously-variable transmission 1 is built into the reduction section 40. The gear head section 33 is coupled to the front part of the reduction section 40. A bevel gear train 35 with a fixed reduction ratio is built as an auxiliary reduction mechanism in the gear head section 33. A spindle 36 is disposed to protrude downward from the gear head section 33. A circular grindstone 37 is fixed to the bottom of the spindle 36. A rechargeable battery pack 38 is disposed in the rear part of the grip section 31. A slide switch 32 is disposed in the front part of the grip section 31. When the slide switch 32 is made to slide forward, a power supply circuit is turned on and the electric motor 34 is started up with the battery pack 38 as a power source. The rotary power of the electric motor 34 is transmitted to the spindle 36 via the continuously-variable transmission 1 of the reduction section 40 and the bevel gear train 35 of the gear head section 33. Similar to the embodiment shown in FIG. 2, the rotation axis line 32 of the spindle 36 is perpendicular to the rotation axis line J0 of the output shaft 8 of the continuously-variable transmission 1.

The reduction section 40 includes a transmission case 41. The grip section 31 is mounted on the rear part of the transmission case 41. The gear head section 33 is mounted on the front part of the transmission case 41. The continuously-variable transmission 1 is built in the transmission case 41. The output shaft 34a of the electric motor 34 is coupled to the input shaft 3 of the continuously-variable transmission 1. The output shaft 34a of the electric motor 34 is fixed to the input shaft 3 in rotation. The input shaft 3 is supported by a bearing 42 so as to rotate about the axis line J0.

The rear part of the output shaft 8 of the continuously-variable transmission 1 is rotatably supported by a bearing 43 mounted on the front surface of the solar roller 4. The front part of the output shaft 8 is rotatably supported by a bearing 44 mounted on the transmission case 41. The carrier 5a, the thrust roller 6, and the thrust cam mechanism 7 are supported on the output shaft 8. The carrier 5a and the thrust roller 6 are supported so as to rotate about the output shaft 8. The pressing part 7b of the thrust cam mechanism 7 engages with the output shaft 8 in rotation. The base frame part 7a of the thrust cam mechanism 7 engages with the thrust roller 6 in rotation.

A holder 50 is mounted on a part of the transmission roller 9 in the peripheral direction. The holder 50 includes two wall parts 50a parallel to each other. The transmission roller 9 is inserted between both wall parts 50a so as to rotate about the axis line J0.

The holder 50 is supported by a slide bar 52 supported on the transmission case 41 so that they can move in parallel forward and backward in a predetermined range. A compression spring 53 is disposed around the slide bar 52 and between the transmission case 41 and the front surface of the holder 50. The holder 50 is biased such that it slides backwards via the compression spring 53. When the holder 50 slides backward, the transmission roller 9 is moved to the small-diameter side of the respective planetary rollers 5. Accordingly, the continuously-variable transmission 1 is switched to the high-speed side (initial position). When the holder 50 slides forward against the compression spring 53, the transmission roller 9 is moved to the large-diameter side of the respective planetary rollers 5. When this occurs, the continuously-variable transmission 1 is switched to the low-speed side. In this way, the transmission roller 9 moves in parallel between the small-diameter side and the large-diameter side of the respective planetary rollers 5 with the parallel movement of the holder 50. Accordingly, the continuously-variable transmission 1 is continuously switched between the high-speed low-torque output state and the low-speed high-torque output state.

A transmission motor 51 is used as a driving source to move the holder 50. A screw shaft 54 is mounted on the output shaft of the transmission motor 51. A nut 55 engages with the screw shaft 54. The front end of the nut 55 is arranged to be in contact with the rear surface of the holder 50. When the transmission motor 51 is started up on the low-speed side, the screw shaft 54 rotates and the nut 55 is moved forward. When the nut 55 is moved forward, the holder 50 is pushed forward against the compression spring 53 and the transmission roller 9 is moved to the low-speed side. When the transmission motor 51 is started up on the high-speed side, the screw shaft 54 rotates inversely and the nut 55 is returned in the rearward direction. When the nut 55 is returned in the rearward direction, the holder 50 is pushed backward by the compression spring 53 and the transmission roller 9 is returned to the high-speed side. The start and stop of the transmission motor 51 to the low-speed side or the high-speed side occurs based on the load of the electric motor 34. The load of the electric motor 34 adjusts in accordance with the grinding resistance applied to the grindstone 37. When the load of the electric motor 34 increases, the transmission motor 51 is started up to the low-speed side and the continuously-variable transmission 1 is switched to the low-speed high-torque output state. When the load of the electric motor 34 decreases, the transmission motor 51 is started up on the high-speed side and the continuously-variable transmission 1 is returned to the high-speed low-torque output state. In this way, the continuously-variable transmission 1 is automatically and continuously switched on the basis of the load of the electric motor 34 increasing or decreasing in accordance with the grinding resistance of the grindstone 37.

A compression spring 7d is interposed between the front part (the bevel gear 35a in this embodiment) of the output shaft 8 and the pressing part 7b of the thrust cam mechanism 7. The biasing force of the compression spring 7d serves to generate a pressing force. The engaging state of the steel balls 7c with the concave engaging portions 7e and 7f also add to the pressing force. The solar roller 4, the thrust roller 6, and the transmission roller 9 are pressed on the respective planetary rollers 5 via the generated pressing force.

The bevel gear 35a on the driving side of the reduction section 33 is coupled to the output shaft 8. The bevel gear 35a rotates along with the output shaft 8. The bevel gear 35a engages with the bevel gear 35b on the receiving side. The bevel gear 35b is fixed to the top of the spindle 36. The spindle 36 is supported to rotate about the axis line J2 by the bearings 36a and 36b. The grindstone 37 is strongly fixed to the bottom of the spindle 36. The grindstone 37 is wedged between a fixing flange 37a and a fixing nut 37b. A grindstone cover 39 covers the rear surface of the grindstone 37. The rear surface is occupies almost half of circumference of the grindstone 37.

In the disc grinder 30, the thrust cam mechanism 7 also serves as a clutch. The thrust cam mechanism 7 is arranged in series between the continuously-variable transmission 1 and the auxiliary reduction mechanism.

In the continuously-variable transmission traction drive 1, the transmission case 41 is filled with a lubricant. The lubricant forms an oil membrane in the pressing parts of the solar roller 4, the thrust roller 6, and the transmission roller 9 on the planetary rollers 5 to 5. In general, traction oil (liquid) is used as the lubricant. Alternatively, traction grease, which has a lower fluidity and a paste phase (semisolid), may also be used as the lubricant in this embodiment.

The traction grease is prepared by combining a metal soap-based or non-soap-based thickener and an additive. Suggested additives include an antioxidant, a solid lubricant, or an anti-rust agent to base oil such as synthetic oil or mineral oil. The base oil content is typically in the range of 70% to 90% of the composition. The thickener content is typically in the range of 10% to 20% of the composition. The traction grease typically has a high traction coefficient. It is contemplated that the above-discussed mixtures may include various compositions having ingredients outside the above specified ranges. Also, certain ingredients may be omitted while other known ingredients may be added to such compositions.

In this embodiment, the thickness of the traction grease is in the range of 265 to 475 ($1/10$ mm). The thickness number of the NLGI (National Lubricating Grease Institute) is in the range of 2 to 000.

In the process of assembling the continuously-variable transmission 1, the traction grease is appropriately applied to the periphery of the solar roller 4, to the entire periphery of each planetary roller 5, to the bottom surface of each planetary roller 5, and to the entire periphery of the pressing groove portions 5b, to the entire periphery of the thrust roller 6, and to the entire inner periphery of the transmission roller 9. A grease reservoir 60 for supplying the traction grease to the pressing parts of the solar roller 4, the thrust roller 6 as well as the transmission roller 9 (located on the planetary rollers 5) is located in the transmission case 41. A front block member 61 is mounted on the front part of the transmission case 41 and a rear block member 62 is mounted on the rear part of the transmission case 41. The space between the front block member 61 and the rear block member 62 serves as the grease reservoir 60. The grease reservoir 60 is filled with a sufficient amount of traction grease. As shown in the drawings, the pressing parts of the solar roller 4, the thrust roller 6, and transmission roller 9 on the planetary rollers 5 are located in the space between the front block member 61 and the rear block member 62. In this way, the traction grease is satisfactorily supplied to the pressing parts.

The front and rear block members 61 and 62 may be a molded product of metal or synthetic resin or may be formed of felt.

The grease reservoir 60 is defined by the front block member 61 and the rear block member 62. Accordingly, traction grease is prevented from leaking to the front of the front block member 61 or and to the outside of the transmission case 41. Unlike the traction oil, traction grease has a low fluidity level. Due to its low fluidity, the traction grease is maintained in the grease reservoir 60 regardless of the direction (posture) of the disc grinder 30.

The traction grease with a paste phase having low fluidity (diffusion) is used as the lubricant for the traction drive. In such an arrangement, the advanced seal typically used when the traction oil is used as a lubricant, is not required. It is not necessary to provide a seal member such as an oil seal or an O ring to the transmission case 41. In this way, the lubricant sealing structure and overall configuration of the continuously-variable transmission 1 are simplified. Compared to liquid traction oil, the possibility of leakage of traction grease is lower. By using this lubricant, maintenance on the continuously-variable transmission 1 does not have to occur as often. The intervals between maintenance periods may thereby be lengthened.

The above-mentioned configuration may be further improved. For example, as indicated by a two-dot chain line in FIG, 5, a felt member 63 having a ring shape is disposed along the front part of the transmission roller 9. The felt member 63 can be made to come in sliding contact with the peripheral edge of the thrust roller 6 and the pressing parts on the planetary rollers 5. In addition, a felt member 64 having a ring shape is disposed in the rear part of the transmission roller 9. This may be made to come in sliding contact with the conical surface of the respective planetary rollers 5. According to this configuration, since the traction grease is appropriately infiltrated into the felt members 63 and 64, the felt members come in direct contact with the conical surface of the respective planetary rollers 5 or the pressing parts of the thrust roller 6 on the respective planetary rollers 5. Accordingly, it is possible to more satisfactorily lubricate them.

Pressing locations on the conical surface of the respective planetary roller 5 and the peripheral edge of the thrust roller 6, are subjected to a specular finishing process. This process prevents abrasion when felt members 63 and 64 are brought into sliding contact with such surfaces.

The grease reservoir 60 may be formed between the felt member 63 and the front block member 61. In this configuration, the rear block member 61 may not be employed.

Figure 6:
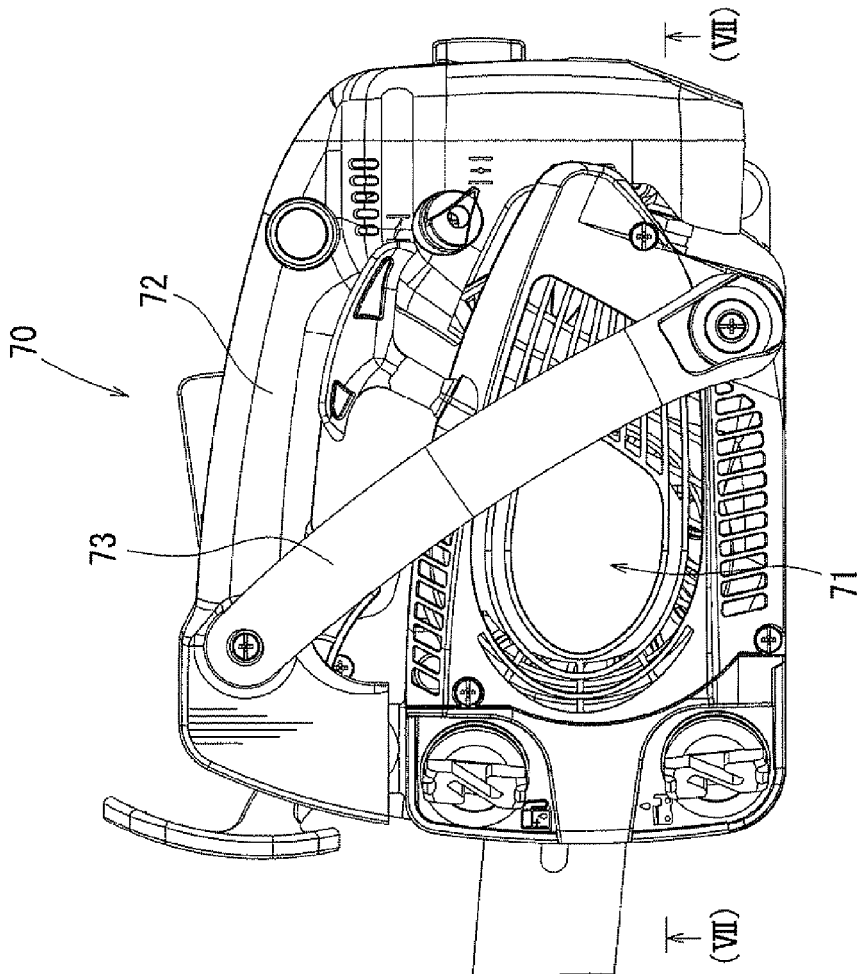
FIG. 6 is a left side view of an engine chain saw.

FIG. 6 shows an engine chain saw 70 as an example of the power tool. The engine chain saw 70 also has a continuously-variable transmission 1. The engine chain saw 70 includes a continuously-variable transmission traction drive 1 and a clutch 80 as a power transmission means for transmitting rotary power in a single direction. The basic configuration of the chain saw is known well and thus the detailed description will not be repeated. In describing the chain saw 70, right and left directions in the drawings are defined in accordance with a user's viewpoint.

Figure 7:
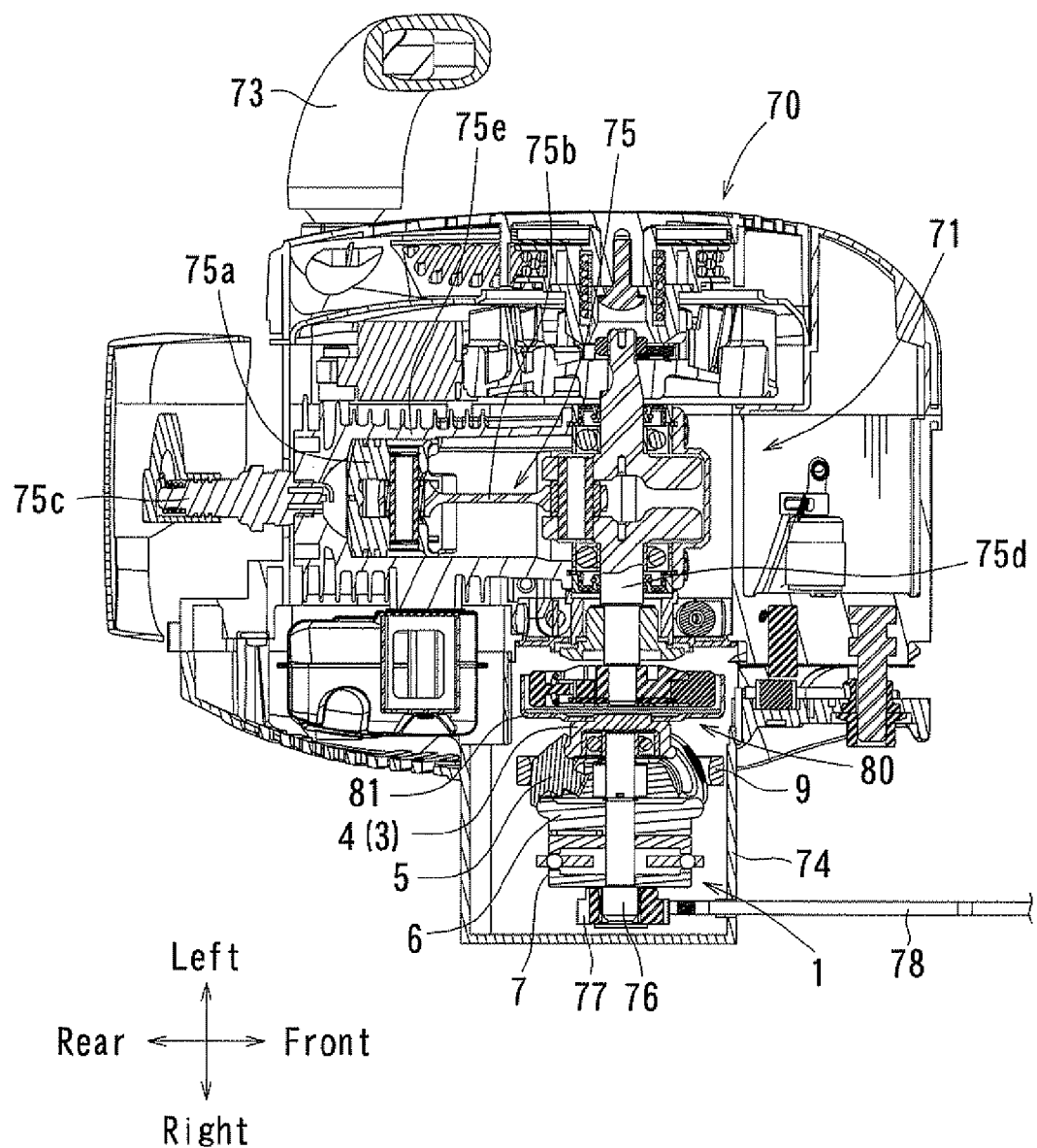
FIG. 7 is a cross-sectional view taken along line VII-VII in FIG. 6 for showing an inner mechanism by viewing from a lower side of the engine chain saw.

The engine chain saw 70 includes a main body section 71 having a two-stroke engine (internal combustion engine) 75 as a driving source, a main handle 72 disposed on the top of the main body section 71, and a sub handle 73 disposed on the left side of the main body section 71. FIG. 7 shows the detailed internal structure of the main body section 71. Only principal members will be described. In FIG. 7, reference sign 75e represents a cylinder block. A piston 75a is received in the bore of the cylinder block 75e so as to reciprocate forward and backwards. An end of a connecting rod 75b is rotatably connected to the piston 75a. The other end of the connecting rod 75b is rotatably connected to a crank shaft 75d. An ignition plug 75c is mounted on the combustion chamber side of the piston 75a. The mixed gas supplied into the combustion chamber via a fuel supply path (not shown) is sparked by the ignition plug 75c. This causes the piston 75a to reciprocate. In the piston 75a of two-stroke process, supply, exhaust, and combustion operations are repeated in the internal combustion engine. The clutch 80 and the continuously-variable transmission 1 transmit rotary power from the crank shaft 75d to the spindle 76. A chain sprocket 77 is mounted on the spindle 76. A chain blade (not shown) is suspended between the chain sprocket 77 and a guide bar 78.

The guide bar 78 has a rectangular panel shape of which an end is supported by a case part 74 located on the right side of the main body section 71. The guide bar 78 extends forward from the case section 74.

The clutch 80 includes a centrifugal clutch mechanism. The clutch 80 transmits the rotary power to the output shaft 81, when the number of rotations of the crank shaft 75d on the input side is greater or equal to a predetermined value. When the number of rotations of the crank shaft 75d is small, rotary power is transmitted to the clutch 80. A user can operate an adjustment mechanism (throttle lever) to adjust the number of rotations of the crank shaft 75d.

The input shaft 3 and the solar roller 4 of the continuously-variable transmission 1 are coupled to the output shaft 81 of the clutch 80. The three-point pressing traction drive shown in FIGS. 3 and 5 is used as the continuously-variable transmission 1. The continuously-variable transmission 1 includes various members such as the planetary rollers 5, the thrust roller 6, the thrust cam mechanism 7, the transmission roller 9 and the solar roller 4. These members are referenced by the same reference signs and description thereof will not be repeated. The compression spring 7d interposed between the output shaft 8 and the pressing part 7b of the thrust cam mechanism 7 is not shown in FIG. 7. The chain sprocket 77 is mounted on the right end of the output shaft 8. In the engine chain saw 70, the output shaft 8 serves as the spindle 76. The chain blade is suspended between the chain sprocket 77 and the guide bar 78. When the chain sprocket 77 rotates, the chain blade rotates along the periphery of the guide bar 78. By bringing the chain blade rotating along the guide bar 78 into contact with a workpiece, for example, wood, a cutting operation can be performed.

The number of rotations of the engine 75 is set to be equal to or more than a predetermined value by adjusting the throttle lever. At a certain cutting resistance, the clutch reaches a point to where it can transmit power. The cutting resistance is applied to the chain blade. A means for measuring this resistance can be used in the embodiment. The transmission roller 9 is automatically moved to the low-speed side upon start-up of the actuator. High torque is output to the spindle 76. As the continuously-variable transmission 1 is automatically switched to the high-torque side on the basis of the cutting resistance, a user can continue to perform the cutting operation. The transmission roller 9 may be displaced by manual operation.

When the cutting operation is finished, and the cutting resistance of the chain blade decreases. The decrease in cutting resistance is sensed by the sensing means and the transmission roller 9 is automatically moved to the high-speed side (initial position). In the idle state the number of rotations of the engine 75 decreases by the adjustment of the throttle lever. In the idle state, the clutch 80 absorbs all of he power transmission. The transmission of the rotary power to the spindle 76 is intercepted and the rotation of the chain blade is stopped. When the throttle lever is operated to elevate the number of rotations of the engine 75, the clutch 80 is completely switched to the rotary power transmission state. In this state, the chain blade starts its rotation along the periphery of the guide bar 78 again.

Figure 8:
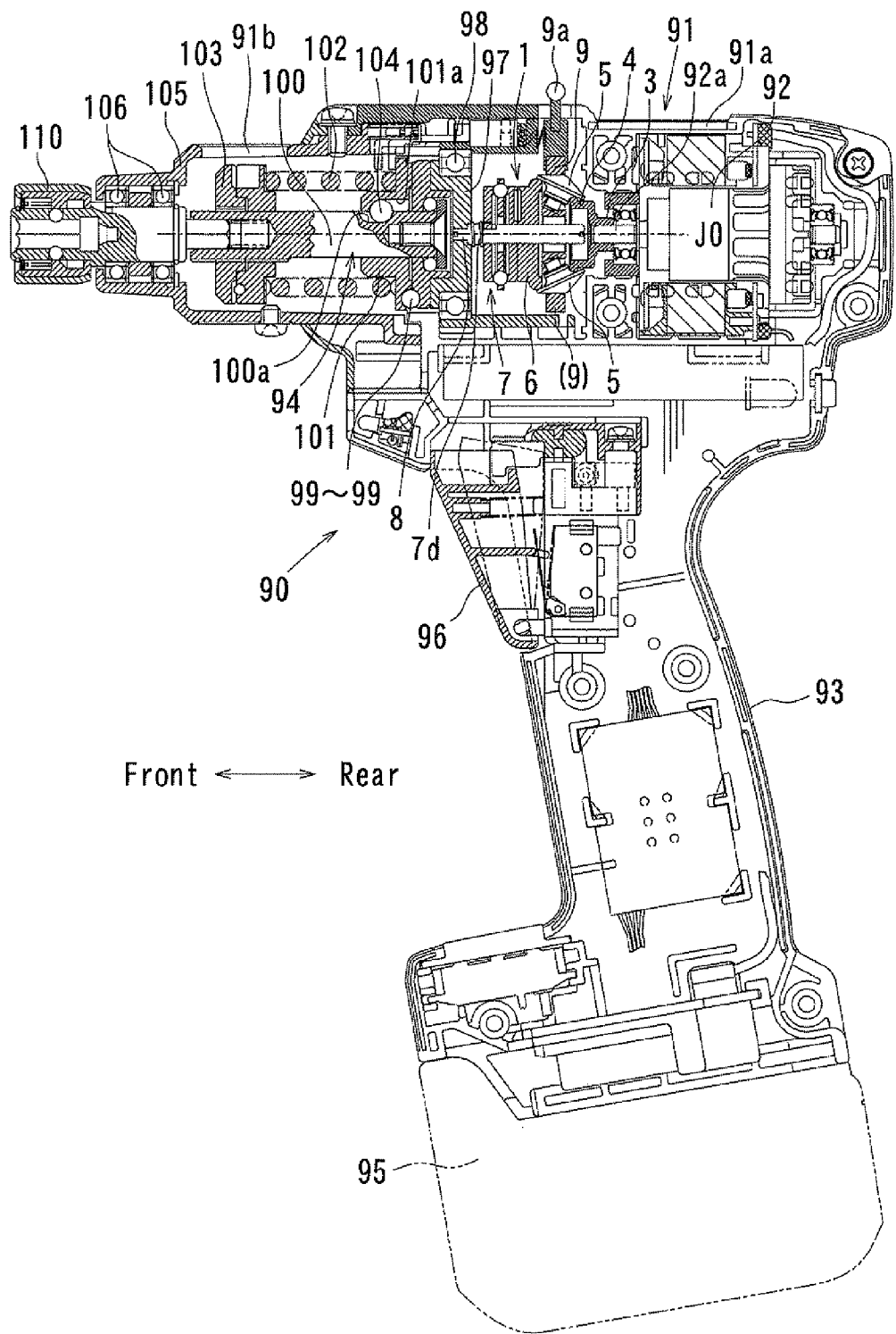
FIG. 8 is a vertical sectional view for showing an inner mechanism of a screw-fastening tool with a continuously-variable transmission and a clutch.

FIG. 8 shows a screw-fastening tool 90 having a three-point pressing continuously-variable transmission 1. The screw-fastening tool 90 includes a main body section 91 having an electric motor 92 as a driving source and a handle section 93 extending laterally from a side part of the main body section 91. A battery pack 95 as a power source is mounted on the front end of the handle section 93. The electric motor 92 is started up using the battery pack 95 as a power source. A trigger-type switch lever 96 is disposed in the base part of the handle section 93. When the switch lever 96 is activated by a user's finger, the electric motor 92 is started up using power supplied from the battery pack 95. When the electric motor 92 is started up, a screw-fastening pit (only a pit socket 110 to be mounted with the pit is shown in the drawing) mounted on the front part of the main body section 91 rotates in the screw-fastening direction.

The electric motor 92 is built in the rear part of a main body housing 91a of the main body section 91. The input shaft 3 of the continuously-variable transmission 1 is coupled to the output shaft 92a of the electric motor 92. The input shaft 3 rotates along with the output shaft 92a. A three-point pressing traction drive is used as the continuously-variable transmission 1, as shown in FIGS. 3, 5, and 7. The members of the continuously-variable transmission 1 are referenced by the same reference signs and description thereof will not be repeated.

A continuously-variable transmission 1 shown in FIG. 8 includes a transmission lever 9a used to manually shift (change a speed of) the transmission roller 9. In using such a tool, the transmission lever is shifted to a low speed when working with a screw having a large diameter. When working with a screw having a small diameter, the transmission lever is shifted to a high speed. In this way, a thick screw can be securely fastened using a large fastening torque and a thin screw can be rapidly fastened using a high-speed rotation. The compression spring 7d of the thrust cam mechanism 7 is not shown in FIGS. 7 and 8.

The output shaft 8 of the continuously-variable transmission 1 is aligned to be coaxially with the output shaft 92a of the electric motor 92 (the rotation axis line J0). A spindle 100 is disposed to be coaxial with the output shaft 8 of the continuously-variable transmission 1 (the rotation axis line J0). A fastening torque setting mechanism 94 used to set a fastening torque of a screw is interposed between the output shaft 8 of the continuously-variable transmission 1 and the spindle 100.

A transmission flange 97 is mounted on the output shaft 8 of the continuously-variable transmission 1. The transmission flange 97 is rotatably supported by the main body housing 91a via a bearing 98, The spindle 100 is coaxially aligned with the transmission flange 97 (via the rotation axis line J0). The spindle 100 can be rotated along the rotation axis line J0. It can also move integrally with the transmission flange 97 linearly in the axis line of direction. A clutch plate 101 is in contact with the front surface of the transmission flange 97 with plural steel balls 99 interposed therebetweenthere between. A compression spring 102 is interposed between the clutch plate 101 and a torque setting flange 103 disposed in the front part of the spindle 100. The clutch plate 101 is biased by the compression spring 102 such that it is pressed on the front surface of the transmission flange 97.

The clutch plate 101 is pressed against the transmission flange 97 by both the biasing force of the compression spring 102 and the steel balls 99 interposed there between. In this method, the rotary power of the transmission flange 97 is transmitted to the spindle 100.

One steel ball 104 is interposed between a groove portion 101a of the clutch plate 101 and a groove portion 100a of the spindle 100. Both groove portions 101a and 100a are formed along the axis line J0. Accordingly, the clutch 101 is displaced in the direction of the axis line J0 while rotating along with the spindle 100. When a large rotation resistance (screw-fastening resistance) is applied to the spindle 100, the clutch plate 101 rotates and is displaced to the front side against the compression spring 102. When the clutch plate 101 is displaced to the front side, the engaging states of the steel balls 99 are released and the transmission of power to the transmission flange 97 is cut off.

A socket 110 to be mounted with a pit is attached to the front part of the spindle 100. The socket 110 is rotatably supported by the front part of the main body case 91a with bearings 106 interposed in-between. A window 91b for adjusting the torque is formed in the front part of the main body case 91a. The window 91b is disposed beside a torque setting flange 103. The torque setting flange 103 is screwed to the spindle 100. Accordingly, by causing the torque setting flange 103 to rotate about the axis line J0, it is possible to adjust the position in the direction of the axis line J0. By adjusting the position of the torque setting flange 103 in the direction of the axis line J0, the biasing force of the compression spring 102 can be changed to adjust the operation setting torque (the torque value by which the transmission of torque to the spindle 100 is intercepted). The torque setting flange 103 can be made to rotate via the window 91b by the use of a dedicated tool.

By appropriately setting the operation setting torque of the fastening torque setting mechanism 94, the steel balls 99 depart from between the transmission flange 97 and the clutch plate 101 when a screw is fastened with the operation setting torque. When this occurs, the transmission of power is cut off.

When the fastening torque is set to be excessively large, the steel balls 7c in the thrust cam mechanism 7 of the continuously-variable transmission 1 are released and the base frame part 7a runs idle. In this situation, the transmission of power is cut off and damage to the driving system, which includes the continuously-variable transmission 1 and the electric motor 92, is prevented. The thrust cam mechanism 7 of the continuously-variable transmission 1 functions to prevent an overload of the driving system. It also functions to generate force used by the solar roller 4, the thrust roller 6, and the transmission roller 9 to press on the respective planetary rollers 5.

According to the above-mentioned embodiments, by using a continuously-variable traction drive transmission for various types of power tools, it is possible to further enhance the performance and value thereof.

For example, in the portable disc saw 10 (power tool) shown in FIG. 1, the rotary power of the electric motor 11 is reduced by the continuously-variable transmission 1 (the three-point pressing traction drive) and is output to the spindle 12 mounted on the saw blade 15. In this situation, the reduction gear train 13 is interposed between the output shaft 1a of the continuously-variable transmission 1 and the spindle 12. The rotation axis line J0 of the output shaft 1a of the continuously-variable transmission 1 and the rotation axis line J1 of the spindle 12 re not aligned coaxially but rather are arranged in parallel with a pre-determined distance between their axes.

The continuously-variable transmission traction drives can be incorporated in power tools such as the portable disc saw 10 where the spindle 12 lies in parallel to the output shaft with a predetermined distance between their axes. In such power tools, the reduction gear train lies between the spindle and output shaft. These continuously-variable transmissions can also be used in power tools such as the known screw fastener or hole-forming drill in which the spindle is aligned coaxially with the output shaft of the continuously-variable transmission. The proper amount of power output can be thus delivered in various machining operations. This enhances the performance and adds value to various power tools.

In the disc grinder 20 shown in FIG. 2, the reduction gear train 22 is interposed between the output shaft 1a of the continuously-variable transmission 1 and the spindle 23. The rotation axis line J0 of the output shaft 1a and the rotation axis line J2 of the spindle 23 are perpendicular to (intersect) each other. By providing a continuously-variable transmission traction drive 1 to this disc grinder, it is possible to enhance its performance and value.

In the portable disc saw 10 shown in FIG. 1 and the disc grinder 20 shown in FIG. 2, the power is continuously changed by the continuously-variable transmission 1. Using a fixed reduction ratio, the power is decelerated by the reduction mechanisms 13 and 20 and output to the spindles 12 and 23. As shown in FIG. 1, the spur gears 13*a* and 13*b* can serve as the reduction mechanism 13 with a fixed reduction ratio. The spindle 12 can be arranged in parallel to the output shaft 1*a* of the continuously-variable transmission 1 with a predetermined inter-axis distance interposed between the two. As shown in FIG. 2, the bevel gears 22*a* and 22*b* serve as the reduction mechanism 22 with a fixed reduction ratio. The spindle 23 can be made to intersect the output shaft 1*a* of the continuously-variable transmission 1. Although not shown in the drawings, the spindle can be arranged coaxially with the output shaft of the continuously-variable transmission by using a planetary gear train as the reduction mechanism with a fixed reduction ratio.

In this way, by adding the reduction gear train with a fixed reduction ratio to the output side of the continuously-variable transmission 1, it is possible to set a larger reduction ratio. The above-mentioned reduction gear trains may be used as reduction means with a fixed reduction ratio to be added to the output side of the continuously-variable transmission 1. In another configuration, the reduction ratios of the spindles 12 and 23 are set to be larger. This is accomplished by suspending a belt between pulleys (which have different effective diameters and are mounted on the output shaft 1*a* of the continuously-variable transmission 1) and the spindles 12 and 23.

As described above, attention may be paid to the directions of the axis lines J1 and J2 of the spindles 12 and 21 Alternatively, attention may be paid to the machining direction of another tool tip on a workpiece. That is, a continuously-variable transmission traction drive is provided as a transmission for power tools having various machining directions. Accordingly, it is possible to use the continuously-variable transmission in a variety of power tools. For example, when an engine chain saw 70 is used to cut wood, the operating direction of the chain blade can be perpendicular to the rotation axis line J0 of the output shaft 8. This can be accomplished by arranging the continuously-variable transmission 1 between the crank shaft 75*d* and the spindle 76. The crank shaft 75*d* rotates with the engine. The spindle is mounted with the chain sprocket 77 and rotates the chain blade. Accordingly, by providing the continuously-variable transmission 1 to the engine chain saw 70, it is possible to rapidly and satisfactorily perform a cutting operation in various machining situations. As a result, it is possible to enhance the performance and value of the engine chain saw 70.

The above-mentioned embodiments may be modified in various forms. For example, the three-point pressing traction drive has been used as the continuously-variable transmission 1. However, a two-point pressin g traction drive including planetary rollers on the output side may be used as the continuously-variable transmission 1.

The thrust cam mechanism 7 has been used as a means for generating the pressing force of the solar roller 4, the thrust roller 6, and the transmission roller 9 on the planetary rollers 5. However, this may be replaced with other type of pressing force generating means such as a screw axis mechanism.

The portable disc saw 10, the disc grinders 20 and 30, the engine chain saw 70, and the screw fastening tool 90 have been described as examples of power tools. However, the invention may be applied to power tools such as a stationary table saw. The invention may also be widely applied to power tools having an air motor as a driving source instead of the electric motor.

In the above-mentioned power tool 1, according to the embodiment, the semisolid traction grease is used as the lubricant of the continuously-variable transmission 1. As a bearing or an oil seal having high seal performance is not necessary, it is possible to simplify the seal structure of the continuously-variable transmission 1. In comparison to when liquid traction oil is used, this can be a simpler configuration. Accordingly, it is possible to reduce the cost of the power tool and to simplify the configuration thereof. The traction grease can be treated as high-viscosity semisolid (paste type) not being as fluid as oil. Accordingly, it is possible to prevent the leakage of the lubricant without providing an advanced seal structure to the transmission case 41 of the continuously-variable transmission 1. This can result in efficient lubrication.

The traction grease has lower possibility of leakage from the transmission case 41 than the traction oil. Accordingly, it is possible to enhance the assembly process and maintenance of the continuously-variable transmission 1.

As traction grease has a low likelihood of leakage, the volume-varying structure does not have to be used. As the temperature and accompanying pressure rises, the pore can be opened to release built-up pressure and thereby avoid leakage of traction oil. In such a device, the volume-varying structure can be used to suppress the increase in pressure. However, when traction grease is used as the lubricant, leakage is unlikely to be a concern despite a rise in pressure. This embodiment can use a transmission case with a fixed volume. For this reason, it is also possible to simplify the configuration of the continuously-variable transmission 1. In case of the traction grease, since the advanced seal structure is not necessary, it is possible to greatly suppress the increase in pressure of the transmission case 41.

In the above-mentioned continuously-variable transmission 1, the free space in the transmission case 41 is reduced by the front and rear block members 61 and 62. Accordingly, it is possible to greatly reduce the amount of traction grease filled and thus to perform efficient lubrication. In case of the above-mentioned transmission case 41, the transmission case 41 is formed in the rectangular box shape. Thus the transmission case 41 can be easily manufactured and the front and rear block members 61 and 62 are disposed in the transmission case 41. Thereby it is possible to reduce the free volume. On the contrary, when a transmission case having an inner surface of a complex shape along the outer shapes of the components of the continuously-variable transmission 1 is manufactured by molding or the like, the cost is raised. However, according to the above-mentioned transmission case 41, it is possible to reduce the free volume at a low cost.

The traction grease having low fluidity is used as the lubricant. Accordingly, it is possible to achieve the same level of lubrication with a smaller amount of traction grease than that of the traction oil which it is generally necessary to agitate and drizzle over necessary parts with the operation of the tool. For example, by encapsulating the traction grease by a half of the free volume of the grease reservoir 60 at a maximum, it is possible to achieve satisfactory lubrication.

The inside of the transmission case 41 is partitioned into two chambers by the front and rear block members 61 and 62. The continuously-variable transmission 1 is received in one chamber (the rear chamber in FIG. 5), and the free volume thereof serves as the grease reservoir 60. For this reason, it is possible to reduce the amount of free volume filled with the traction grease with respect to the total free volume of the transmission case 41. Accordingly, it is possible to achieve efficient lubrication with a small amount of traction grease. Particularly, by arranging the three-point pressing parts of the continuously-variable transmission 1 in one chamber and using the free volume thereof as the grease reservoir 60, it is possible to perform more efficient lubrication with a smaller amount of traction grease and satisfactorily transmit power.

The ring-like felt members 63 and 64 are disposed along the transmission roller 9. The traction grease infiltrates the felt members 63 and 64 and the felt members are brought into sliding contact with the three-point pressing parts of the continuously-variable transmission 1. In this manner, the parts may be lubricated. The felt members 63 and 64 can be used as walls to partition the inside of the transmission case 41 into two chambers. It is possible to form the grease reservoir 60 while preventing the leakage of the traction grease by the use of the felt members 63 and 64. The felt members can be brought into sliding contact with the three-point pressing parts to intensively lubricate the three-point pressing parts.

The above-mentioned embodiments may be modified in various forms. For example, the felt members 63 and 64 may not be employed. Alternatively the felt members 63 and 64 may be used and the front and rear block members 61 and 62 may not be used.

The properties of traction grease may be adjusted by modifying the amount of thickener, the type of thickener or the traction coefficient of the continuously-variable transmission 1.

The three-point pressing traction drive has been used as the continuously-variable transmission 1. However, a two-point pressing traction drive including planetary rollers on the output side may be used as the continuously-variable transmission 1.

The thrust cam mechanism 7 has been used as a means for generating the pressing force of the solar roller 4, the thrust roller 6, and the transmission roller 9 on the planetary rollers 5. However, it may be replaced with another type of pressing force generating means such as a screw axis mechanism.

The portable disc saw 10, the disc grinders 20 and 30, the engine chain saw 70, and the screw-fastening tool 90 have been used as the power tool. However, the invention may be applied to power tools such as a stationary table saw. The invention may be widely applied to power tools having an air motor as a driving source instead of the electric motor.

The invention claimed is:

1. A power tool comprising:
    a continuously-variable transmission traction drive, the continuously-variable transmission drive having an output shaft and a spindle; and
    a tool tip to be mounted on the spindle,
    wherein the spindle is not aligned coaxially with the output shaft of the continuously-variable transmission, and
    wherein the spindle is arranged to intersect the output shaft of the continuously-variable transmission.

2. The power tool of claim 1, further comprising an auxiliary reduction mechanism with a fixed reduction ratio.

3. The power tool of claim 2, wherein the reduction mechanism is a gear-reduction mechanism.

4. The power tool of claim 2, wherein the reduction mechanism is a belt-reduction mechanism.

5. The power tool of claim 1, wherein a reduction ratio of the continuously-variable transmission is changed depending on a load of the tool tip.

6. The power tool of claim 1, wherein the continuously-variable transmission is a differential planetary mechanism type.

7. The power tool of claim 1, further comprising a lubricant for the continuously-variable transmission, wherein the lubricant is a semisolid in a normal state.

8. The power tool of claim 7, wherein the lubricant is a grease with a high traction coefficient, and wherein the grease comprises base oil and a thickener added to the base oil.

9. The power tool of claim 8, wherein the lubricant includes a thickener between 10 to 30 percent.

10. The power tool claim 7, wherein the thickness of the lubricant is set to be within a range of 265 to 475.

11. The power tool of claim 7, further comprising a transmission case having an inner volume for receiving the continuously-variable transmission, wherein the inner volume is fixed.

12. The power tool of claim 7, wherein the transmission case receiving the continuously-variable transmission includes a member for reducing free volume.

13. The power tool of claim 7, wherein the amount of lubricant encapsulated in the transmission case is set to a maximum of a half of the free volume of the transmission case.

14. The power tool of claim 7, further comprising a transmission case receiving the continuously-variable transmission,
    wherein the transmission case is partitioned into two chambers
    wherein the continuously-variable transmission is a three-point pressing traction drive, comprising
    a conical planetary roller,
    a solar roller pressed against the conical planetary roller,
    a thrust roller pressed against the conical planetary roller,
    a transmission roller pressed against the conical planetary roller, and
    wherein the pressing part of each of the rollers is arranged in one of the chambers.

15. The power tool of claim 14, wherein the transmission case is partitioned by a wall formed of felt.

16. The power tool of claim 14, wherein one of the chambers serves as a lubricant reservoir in which the lubricant is encapsulated.

17. A power tool comprising:
    a continuously-variable transmission traction drive, the continuously-variable transmission drive having:
    a solar roller provided on a motor shaft,
    planetary rollers pressed on the solar roller,
    a carrier aligned coaxially with the motor shaft, the carrier configured to rotatably support the planetary rollers,
    an output shaft aligned coaxially with the motor shaft, torque of the motor shaft being transmitted to the output shaft through the solar roller and the planetary rollers, and
    a spindle; and
    a tool tip to be mounted on the spindle,
    wherein the spindle is not aligned coaxially with the output shaft of the continuously-variable transmission.

18. The power tool of claim 17, wherein the spindle is arranged to intersect the output shaft of the continuously-variable transmission.

19. The power tool of claim 17, wherein the spindle is arranged in parallel to the output shaft of the continuously-variable transmission 20. The power tool of claim 17, further comprising an auxiliary reduction mechanism with a fixed reduction ratio.

21. The power tool of claim 20, wherein the reduction mechanism is a gear-reduction mechanism.

22. The power tool of claim 20, wherein the reduction mechanism is a belt-reduction mechanism.

* * * * *